United States Patent [19]

Lowe, Jr.

[11] 4,243,415
[45] Jan. 6, 1981

[54] DEICING AND TRACTION FORMING COMPOSITION AND METHOD OF MAKING SAME

[76] Inventor: Henry E. Lowe, Jr., 348 S. Columbia St., South Bend, Ind. 46601

[21] Appl. No.: 960,733

[22] Filed: Nov. 15, 1978

Related U.S. Application Data

[63] Continuation-in-part of Ser. No. 884,914, Mar. 8, 1978, abandoned.

[51] Int. Cl.$^2$ .............................................. C09K 3/18
[52] U.S. Cl. ...................................... 106/13; 106/36; 427/215
[58] Field of Search ...................... 106/13, 36; 252/70; 427/215

[56] References Cited

U.S. PATENT DOCUMENTS

| | | | |
|---|---|---|---|
| 1,825,151 | 9/1931 | Keoleian | 252/70 |
| 2,410,910 | 11/1946 | Wait | 106/36 X |
| 2,626,219 | 1/1953 | Wagner | 106/36 |
| 4,108,669 | 8/1978 | Orthalek | 252/70 |

FOREIGN PATENT DOCUMENTS 1534176  7/1969  Fed. Rep. of Germany ............. 252/70

Primary Examiner—Sam Silverberg
Attorney, Agent, or Firm—Marmaduke A. Hobbs

[57] ABSTRACT

A deicing and traction forming composition in which particles of clay are impregnated and coated with a salt, such as sodium chloride, calcium chloride, and/or ammonium chloride so that, when the particulate material is used to deice and form a traction surface, the salt immediately begins the ice melting action followed by a more gradual action from the release of the salt from the particles. The particles are water softening, readily disintegratable under the pressure of foot and vehicle traffic to release the absorbed salt and to form a traction surface on the ice. A method is used in the production of the composition consisting of heating crushed clay to drive off the moisture and, after screening the particulate material to obtain a somewhat uniform particle size and while it is still at an elevated temperature, spraying the particles with a salt solution. The salt solution is absorbed and adsorbed by the particles, and the moisture is quickly driven off by the heat from the particles, thus leaving a dried particulated mass which can easily be stored, packaged, shipped and used in particulate form.

9 Claims, 1 Drawing Figure

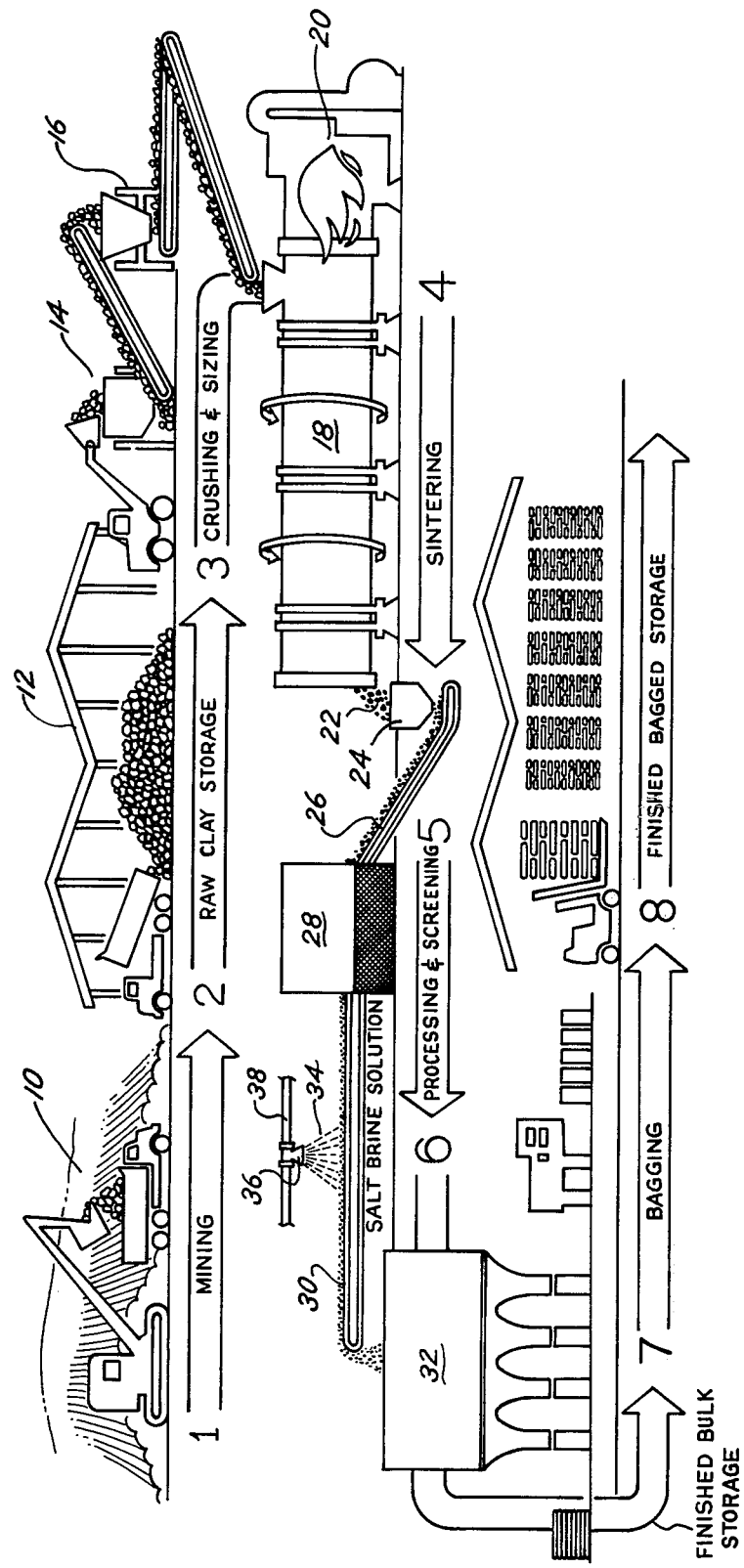

DEICING AND TRACTION FORMING COMPOSITION AND METHOD OF MAKING SAME

This application is a continuation-in-part of my application Ser. No. 884,914 filed on Mar. 8, 1978 now abandoned.

A widely used practice of deicing highways, driveways, walks and steps involves the use of a mixture of sand and salt which will melt the ice if the temperature is not too low for the salt concentration, and simultaneously will apply a coating which provides traction on either the unmelted or partially melted ice. One of the disadvantages of this practice is the tendency of the salt to separate from the sand and penetrate the ice, and sink, sometimes in crystalline form, to the bottom or lower layers of the ice while leaving the sand primarily on the surface of the ice. Thus, if the temperature is rather low, for example below about 10° F., the surface of the ice may again freeze, leaving only the sand to reduce the glaze and to eliminate slippery and hazardous surface conditions. Other combinations and mixtures of materials, such as cinders and slag mixed with sodium or potassium chloride, have been used, but these materials generally fail to overcome the aforementioned difficulties and deficiencies encountered with the sand and salt mixture. While some of these materials may be porous and tend to absorb a portion of the salt for a partially delayed release of the salt, they are hard and depend on penetration of the moisture to release the absorbed salt. This requires time and may accomplish only partial release of the salt, or delay the action to the extent where the effectiveness of the material used in the composition is not properly utilized. It is therefore one of the principal objects of the present invention to provide a deicing and traction forming composition which rapidly releases a salt when the material is initially applied to the ice covered surface, and releases the additional salt quickly when subjected to traffic, and which provides a long lasting traction surface on the ice after the salt no longer is effective.

Another object of the invention is to provide a composition for deicing and for forming a traction surface on ice, which can easily be handled and applied to icy surfaces, such as steps, walks, driveways and similar structures, and will provide an immediate and long lasting traction surface on the ice, and which can be stored in the home and conveniently used on steps, walks and other small ice slickened areas.

Still another object is to provide a composition for deicing and/or forming a traction surface on the ice which can be carried in vehicles for emergency use in the event the vehicle becomes stuck or stranded on slick pavement, and which can be safely and conveniently stored and handled.

A further object is to provide a method of producing the aforementioned composition, which can readily be adapted to standard production facilities.

The present invention utilizes salt, such as sodium chloride, calcium chloride or ammonium chloride or a mixture of these salts, in combination with a moisture softening, disintegratable clay particulate material which initially absorbs and adsorbs the salt, and which when applied to an ice covered surface quickly releases the adsorbed salt for effective action on the ice and then follows the initial action by releasing the salt from the clay particles by absorption of the moisture from or water on the ice, and/or by the disintegration of the clay particles when subjected to the pressure of traffic on the ice covered surface. Upon disintegration, the clay particulate material initially forms a layer of small particles which provide an effective traction surface on the ice as the salt performs its ice melting function, and may continue thereafter when the salt is no longer effective.

The quantity by weight of one or more of the foregoing chloride salts used for a given quantity by weight of sintered clay particles in my composition may be varied over a wide range and still obtain an effective traction and deicing action with the composition. The action of the composition is essentially the same for any of these mixtures in which the salt is absorbed and adsorbed in the disintegratable, sintered clay particles capable of being softened by the water from the melting ice or snow. In use, the release of the adsorbed salt from the particles will take place immediately when the material is applied to an icy surface, and thereafter the absorbed salt will continue to be released to promote a prolonged ice melting action. During the initial period after the application of the material, the clay particles remain essentially intact and may tend to become partially embedded in the surface of the ice. The water from the melting ice tends to soften the clay particles, and, when the surface to which the material has been applied is subjected to foot or vehicular traffic, the clay particles disintegrate under the weight of the traffic, releasing undissolved crystalline salt or salts which, together with the relatively fine disintegrated particulated material, form an effective non-skid surface on the ice while performing an ice melting operation. The salt or salts thereafter continue to perform the ice melting function while the small disintegrated clay particles perform their traction action, and the undisintegrated or partially disintegrated clay particles continue their release of the absorbed salts. The amount of salt or salts used in the composition depends upon the specific nature of the action desired. For example, when a prolonged melting of the ice is desired, a larger ratio of salt or salts to clay particles is used. However, the traction provided initially by the material is essentially the same regardless of the ratio selected. If the primary function desired is the initial traction action, a material having a relatively low salt or salts to particulated clay ratio is preferred.

The FIGURE in the drawing is a diagrammatical view of the process and equipment used in the production of the present deicing and traction forming composition.

Referring more specifically to the drawing, numeral 10 indicates the source of the material, which is a clay normally referred to as Fuller's Earth. The raw clay from the mine may be stored in a bin or other enclosed storage area 12 and is thereafter crushed and sized by the equipment identified by numerals 14 and 16. The crushed and sized material is fed into a rotary kiln 18 where it is dried and sintered by heat from a burner 20. The hot particulate material 22 is discharged from the left hand end of the kiln into a hopper 24 and is carried by conveyor 26 to screening equipment 28. The particles which are still hot are moved by conveyor 30 from the screening equipment to hopper 32.

While the clay material is in the kiln, it is heated to a temperature sufficient to remove most of the pore water, creating dried and hardened clay particles. The temperature in the kiln is not so extreme as to remove the bound water or water of crystallization of the clay compound. Therefore, the nonreversible ceramic change of vitrification does not occur. Since the drying temperature is less than the vitrification point, the clay material is not fused to the nonporous, water resistant, glass-like material of brick or ceramic, but remains porous clay in a dried and relatively hardened condition. This dried clay material then has two qualities, the combination of which is uniquely advantageous in a deicing and traction forming material. The drying makes the clay granular and firm, thereby providing an immediate gritty traction surface when applied to ice. The material has also remained porous, retaining the quality of being able to absorb and be softened by water. As the initial melting process begins, the water from the melting ice softens the clay particles, making them readily disintegratable under foot or vehicular traffic. This moisture softening, which does not occur with the conventionally used materials, such as cinders, sand or slag, provides efficient release of the ice melting materials when the mixture is subjected to traffic. The combination of providing an immediate gritty traction material as well as providing an efficient and rapid release of salt when subjected to traffic in the moisture softened condition, makes the present salt impregnated clay material particularly advantageous over cinders, sand or slag used in the past in the deicing and traction mixtures.

As the hot particulate material is moved on conveyor 30, it is sprayed with a salt solution 34 from a spray nozzle 36, the salt solution normally being sodium chloride, calcium chloride and/or ammonium chloride in an aqueous solution delivered to the nozzle through a conduit 38. As the salt solution is discharged in a spray onto the hot material, the material is cooled and the salt solution is initially absorbed by the hot particles and the particles with the absorbed salt, and are coated with a residue of salt. The heat in the particles causes rapid evaporation of the water from the solution so that, by the time the material reaches the left hand end of conveyor 30 as viewed in the drawing, i.e. before it reaches hopper 32, the particles are dry and remain in a particulate condition without adhering to one another. The salt-laden material may be stored in hopper 32 for a period of time and is normally thereafter bagged or otherwise packaged for shipment to customers.

The concentration of the salt relative to the clay is controlled either by varying the amount of sprayed solution, or the concentration of the solution sprayed onto the hot particulate material on conveyor 30, and the speed of the conveyor beneath the spray nozzle. A coloring material such as a green or blue dye may be applied to the material with and as part of the salt solution in spray 34, or it may be applied to the material by spraying the coloring liquid onto the material after the salt solution has been applied. The coloring material is intended merely to provide particular color for appearance and/or for quick identification purposes. Although the preferred embodiment of the foregoing process involves the spraying of the salt solution on the hot sintered particulate clay material, the salt solution can be sprayed or otherwise applied to the particles after they have cooled, provided sufficient time is permitted for drying before storage in a storage bin such as hopper 32, to prevent adherence of the particles to one another.

The material produced by the foregoing method can be conveniently packaged in relatively small bags of ten to twenty five pounds and carried in a vehicle or stored in a home ready for use when the vehicle becomes stuck in snow or on ice, and can be quickly used on doorsteps, stoops, walks, driveways and the like. It will remain effective for a substantial period of time, providing an effective traction surface on the ice and simultaneously performing the ice melting operation so that the ice can be easily removed manually or removed by complete melting thereof. In view of the release of the absorbed material, the prolonged action makes the material particularly advantageous for such uses, and yet it initially provides an effective, gritty traction surface. The effectiveness of the composition is enhanced by the disintegration of the particulate material, either naturally over a period of time from the water in the melting ice which tends to soften the particles and dissolve the salt, or immediately by the pressure of traffic thereon.

While only one embodiment of the present deicing and traction forming composition and method for producing the same has been described in detail herein, various changes may be made to satisfy requirements.

I claim:

1. A deicing and traction forming composition comprising moisture softening clay particles heat-dried at a temperature below the point at which bound water is removed, said particles retaining absorptive properties and being readily disintegratable by the pressure of foot and vehicular traffic when softened by absorption of water from melting ice, and a chloride salt impregnating and coating said particles and being releasable from said particles initially by solution of the salt coating in water from an icy surface and thereafter by solution of the salt absorbed in said clay particles as said particles disintegrate and are softened by the water from the melting ice.

2. A deicing and traction forming composition as defined in claim 1 in which said salt consists primarily of sodium chloride.

3. A deicing and traction forming composition as defined in claim 1 in which said salt is calcium chloride.

4. A deicing and traction forming composition as defined in claim 1 in which said salt consists of a mixture of chloride salts from a group consisting of sodium chloride, calcium chloride and ammonium chloride.

5. A deicing and traction forming composition as defined in claim 1 in which said salt is ammonium chloride.

6. A method of producing a deicing and traction forming composition, comprising the steps of crushing moisture softening, raw clay, sizing the crushed clay, heat-drying said crushed clay to remove pore water at a temperature below the point of nonreversible ceramic change, screening said dried clay while still in an elevated temperature to obtain a mass of clay particles capable of being softened by the water from melting ice, impregnating and coating said clay particles with a chloride salt solution while maintaining said moisture softening clay in particulate form, and evaporating the water from said solution.

7. A deicing and traction forming composition as defined in claim 6 in which said salt solution includes sodium chloride.

8. A deicing and traction forming composition as defined in claim 6 in which said salt solution includes calcium chloride.

9. A deicing and traction forming composition as defined in claim 6 in which the heat-drying of said clay material consists in sintering the clay to obtain porous moisture softening, readily disintegratable particles.

* * * * *